Aug. 30, 1938.　　　　F. W. COREY　　　　2,128,579
ANIMAL TRAP
Filed May 14, 1936
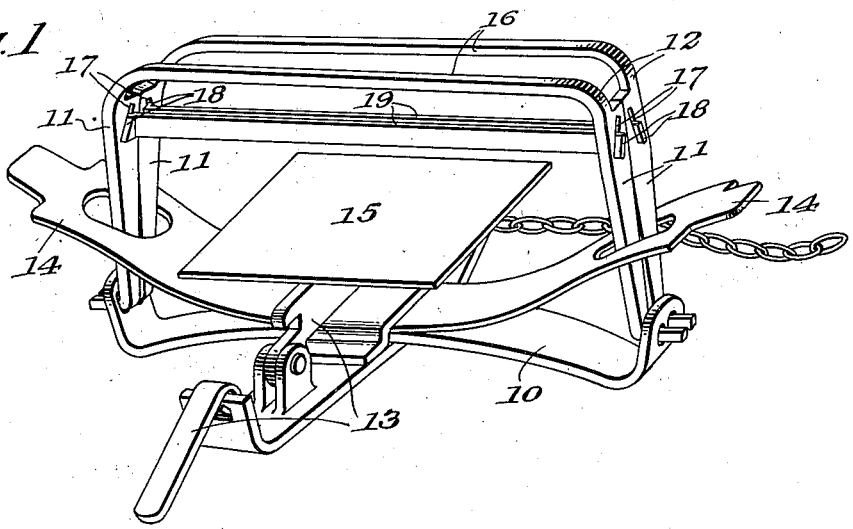
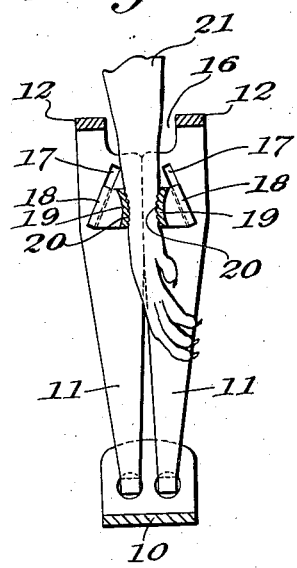
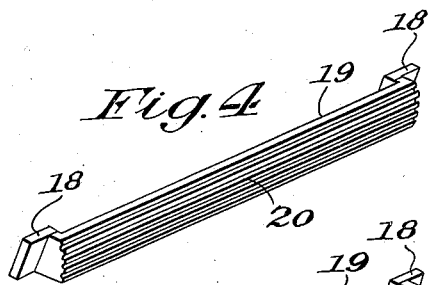
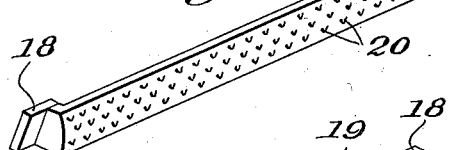
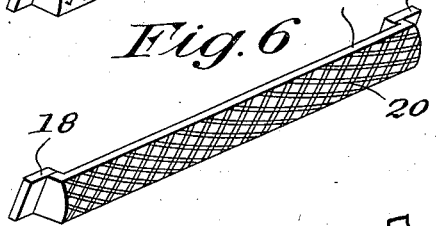
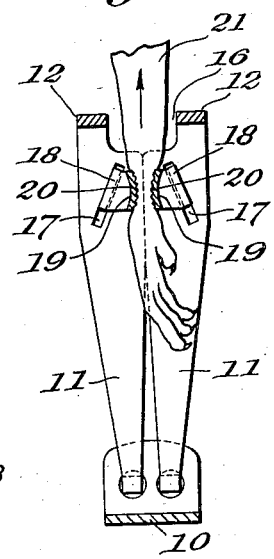
Inventor:
Fred W. Corey,
By Pike, Calver & Gray,
Attorneys Patented Aug. 30, 1938

2,128,579

UNITED STATES PATENT OFFICE 2,128,579

ANIMAL TRAP

Fred W. Corey, Tilton, N. H.

Application May 14, 1936, Serial No. 79,699

1 Claim. (Cl. 43—90)

This invention relates to animal traps of the jaw type and has for its principal objects to provide a trap of this type wherein an animal will be much more securely held against escape than heretofore while materially reducing the possibility of mutilation or laceration of the entrapped limb.

An animal caught in a jaw trap of the usual construction will frequently gain its liberty by gnawing off its foot or paw below the trap jaws, whereupon, by a continuous effort, the still confined stump is drawn outwardly from between the jaws. Even when escape from such a trap is not effected in this manner, the struggles of the animal usually result in severe laceration of the limb if the jaws be so designed as to hold it with any considerable degree of security. The present invention provides a trap having jaws of such a character that attempts to release a trapped limb by drawing the same outwardly from between the jaws will result in the limb being gripped more firmly, the stronger the pull, the tighter the grip, this however being accomplished with minimum injury to the limb.

The invention will best be understood from the following description of a preferred embodiment thereof shown in the accompanying drawing, this, however, having been chosen for illustrative purposes only, as it will be obvious to those skilled in the art that the invention, as defined by the claim hereunto appended, may be otherwise embodied without departure from its spirit and scope.

In said drawing:

Fig. 1 is a perspective view of a trap constructed in accordance with the invention.

Figs. 2 and 3 are transverse vertical sectional views illustrating the operation.

Fig. 4 is a detail perspective view of one of the supplementary jaws.

Figs. 5 and 6 are views similar to Fig. 4 illustrating modifications.

In Fig. 1 is shown a jaw trap of a generally familiar type comprising a base 10 to which are pivoted the ends of the legs 11 of a pair of U-shaped main jaw members 12 adapted to be held in open position by trigger mechanism 13 and be closed upon the limb of an animal by a spring 14 when said trigger mechanism is released by pressure upon a pan 15. As thus far described, the parts may be of any usual or well known construction.

In accordance with the present invention the top portions of the main jaw members 12 are preferably cut away, as shown at 16, to prevent direct engagement thereof with the limb of an entrapped animal, while the leg portions 11 thereof are formed with ways or slots 17 to receive flattened lugs 18 formed on the ends of auxiliary or supplementary jaws 19. The ways or slots 17 are arranged to converge outwardly with respect to the pivotal points of the main jaw members 12. The shape of the lugs 18 with relation to the slots 17 is such as to prevent turning of the former in the latter, while the arrangement is such that movement of the supplementary jaws outwardly with respect to the main jaws, when the latter are closed as shown, will cause said supplementary jaws to approach one another. The supplementary jaws 19 comprise limb-engaging portions 20 formed with extended limb-engaging surfaces, that is to say, with surfaces which are substantially broader and which engage the limb over a substantially greater area than the edges of the jaws of traps of this type as usually constructed, said surfaces being roughened to reduce the possibility of slipping. This roughening may be accomplished in a variety of ways. As shown in Fig. 4, the surface is formed with a series of parallel longitudinal grooves forming ridges or corrugations. As shown in Fig. 6, inclined intersecting grooves or corrugations are provided. As shown in Fig. 5, the surface is provided with small hook-shaped or inwardly inclined teeth.

In operation, when the trap is sprung to cause the main jaws 12 to close upon the limb 21 of an animal, the latter is caught, not by said main jaws, but by the limb-engaging portions 20 of the auxiliary jaws 19 and firmly held thereby, as shown in Fig. 2. By reason of the roughened surfaces of said auxiliary jaws any outward pull of the limb in the direction of the arrow in Fig. 3 causes said auxiliary jaws to be moved outwardly with it and consequently, by reason of the slots 17, to approach one another and grip the limb more firmly, the extended surfaces of said jaws, however, being such that, while they securely retain the limb, they have no tendency to cut or lacerate the same. Consequently the more the animal struggles to escape the more firmly will it be held but without mutilation or other injury.

I claim:

A trap having a pair of pivoted U-shaped jaws, converging slots in the jaws when the jaws are positioned in sprung position, said slots having parallel walls, and a pair of auxiliary jaws having extended limb engaging faces and provided at their ends with flattened lugs having slidable contact with the parallel walls of said slots and held against turning therein.

FRED W. COREY.